(12) United States Patent
Wang et al.

(10) Patent No.: US 7,652,835 B2
(45) Date of Patent: Jan. 26, 2010

(54) OPTICAL DEVICES

(75) Inventors: Yung-Hsing Wang, Taichung (TW); Jin-Yu Lee, Tainan (TW); Meng-Che Tsai, Kaohsiung (TW); Chien-Sheng Liu, Tainan County (TW); Shun-Sheng Ke, Kaohsiung (TW); Ying-Chi Cho, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 454 days.

(21) Appl. No.: 11/542,844

(22) Filed: Oct. 4, 2006

(65) Prior Publication Data

US 2008/0010651 A1    Jan. 10, 2008

(30) Foreign Application Priority Data

Jul. 5, 2006    (TW) ............................. 95124457 A

(51) Int. Cl.
    G02B 7/02    (2006.01)
(52) U.S. Cl. .................. 359/824; 359/822; 359/814
(58) Field of Classification Search .................. 359/824
    See application file for complete search history.

(56) References Cited

U.S. PATENT DOCUMENTS

| | | | | |
|---|---|---|---|---|
| 5,815,328 A | * | 9/1998 | Makita | .......... 359/824 |
| 6,856,469 B2 | | 2/2005 | Yoneyama et al. | |
| 7,298,562 B2 | * | 11/2007 | Sue et al. | .......... 359/819 |
| 7,365,922 B2 | * | 4/2008 | Lee et al. | .......... 359/813 |
| 2004/0130808 A1 | | 7/2004 | Yoneyama et al. | |
| 2004/0207936 A1 | | 10/2004 | Yamamoto et al. | |

FOREIGN PATENT DOCUMENTS

| | | |
|---|---|---|
| JP | 8005892 A | 1/1996 |
| JP | 10246848 A | 9/1998 |
| JP | 2003295033 A | 10/2003 |
| JP | 2005-128405 | 5/2005 |
| JP | 2005341636 A | 12/2005 |
| JP | 2006106070 A | 4/2006 |
| WO | WO 2005/060242 A1 | 6/2005 |

* cited by examiner

*Primary Examiner*—Jessica T Stultz
(74) *Attorney, Agent, or Firm*—Quintero Law Office

(57) ABSTRACT

An optical device. A drive moving assembly includes a lens module and a drive coil. The drive coil surrounds the lens module and provides a central axis parallel to an optical axis of the lens module. A drive stator includes a housing, a magnetic member, and a yoke. The lens module is movably disposed in the housing. The magnetic member surrounds the drive coil and includes an opening. The yoke interacts with the magnetic member, generating a magnetic field. The magnetic member, yoke, and drive coil interact to move the drive moving assembly parallel to the optical axis. A brake coil is disposed in the opening. A braking resilient member is connected between the drive stator and the brake coil and disposed in the opening. The brake coil interacts with the magnetic member, yoke, and braking resilient member and detachably abuts the drive moving assembly.

13 Claims, 14 Drawing Sheets

OPTICAL DEVICES

BACKGROUND OF THE INVENTION

1. Field of the Invention

The invention relates to optical devices, and in particular to optical devices with reduced electrical consumption and enhanced shockproof capability.

2. Description of the Related Art

Automatic displacement drive devices applied in lens modules may employ drivers providing rotational power with a rotational axis thereof paralleling an optical axis of the lens module, or drivers providing movement power with the moving direction thereof paralleling the optical axis of the lens module.

An example of a driver providing rotational power with a rotational axis thereof paralleling an optical axis of the lens module is a stepping motor. Such drivers require additional transmission-conversion mechanisms to enable the lens module to move along an axis parallel to the optical axis. When the lens module arrives at a final position, no electricity is required to maintain the lens module therein. However, such drivers have many components. Thus, the structure of such drivers is complicated, and the size thereof cannot easily be reduced.

An example of a driver providing movement power with the moving direction thereof paralleling the optical axis of the lens module is a voice coil motor. Such drivers directly adjust the position of the lens module. Compared with rotational power drivers, such drivers have fewer components and are smaller. However, when the lens module arrives at a final position, electricity must be continuously supplied thereto and simultaneous control maintained in order to keep the lens module at the final position. Accordingly, automatic displacement drive devices employing such drivers consume a great deal of electrical power. The portability of cameras or optical devices employing such drivers is thus adversely affected. Additionally, such drivers provide poor shockproof capability.

Referring to FIG. 1, U.S. Pat. No. 6,856,469 discloses a conventional lens drive device with a magnetic member 9, a spacer member 12, and a spring member 50 arranged parallel to an optical axis of a lens 2. The lens 2 is retained at retaining positions by magnetic attraction between a drive magnet 6 and the magnetic member 9 and by the spring member 50. However, electrical power is required to retain the lens 2 at the retaining positions, and the relationship between the moving position of the drive magnet 6 and magnetic member 9 and the variation of magnetic force thereof is nonlinear. Accordingly, positioning control of the lens 2 in the conventional lens drive device is difficult.

Moreover, as shown in FIG. 2A and FIG. 2B, WO2005/060242 discloses a conventional brake device capable of releasing or holding a lens module 608 at specific positions. The brake device comprises a brake and holding member 621, a magnetic member 627, a coil 623, a rotating shaft 622, and a resilient element E. When the coil 623 is energized by application of an electric current, magnetic attraction is generated between the magnetic member 627 and the coil 623. At this point, the brake and holding member 621 rotates around the rotating shaft 622, releasing the lens module 608, as shown in FIG. 2B. When the coil 623 is not energized by application of the electric current, no magnetic attraction is generated between the magnetic member 627 and the coil 623. At this point, the brake and holding member 621 rotates to an initial position around the rotating shaft 622 by resilience provided by the resilient element E, holding the lens module 608, as shown in FIG. 2A. However, the conventional brake device has many components and complex structure and is not easily assembled and miniaturized.

Additionally, as shown in FIG; 3A and FIG. 3B, Japan Patent Publication No. 2005-128405 discloses a conventional lens drive device 1. An upper spring 9 and a lower spring 11 enable precise movement of a lens module (including a lens 20, an upper cover 24, a lower washer 17, a coil 15, and a lens supporting base 7) and reduce friction during movement thereof. The upper spring 9 and lower spring 11 may be regarded as extensions of the coil 15, serving as conductors at ends thereof. Grooves 37 on an upper frame 23 and ribs 31 on the lens supporting base 7 bear impact or vibration generated by contact between a moving assembly (including the lens 20, upper cover 24, lower washer 17, coil 15, and lens supporting base 7) and a stator (including the upper frame 23, a yoke 3, and a magnet 13), controlling a deviation value of the moving assembly with respect to an optical axis within an acceptable scope and preventing excessive rotation of the lens 20 from adversely affecting other mechanisms in the lens drive device 1. Nevertheless, electrical power is also required to maintain the moving assembly of the lens drive device 1 in specific positions, thus reducing long-term positioning capability thereof.

Hence, there is a need for optical devices, for fixing and releasing a lens module, with reduced size and power consumption, simplified structure, and enhanced shockproof capability.

BRIEF SUMMARY OF THE INVENTION

A detailed description is given in the following embodiments with reference to the accompanying drawings.

An exemplary embodiment of the invention provides an optical device comprising a drive moving assembly, a drive stator, a brake coil, and a braking resilient member. The drive moving assembly comprises a lens module and a drive coil. The lens module provides an optical axis. The drive coil surrounds the lens module and provides a central axis parallel to the optical axis. The drive stator comprises a housing, a magnetic member, and a yoke. The lens module is movably disposed in the housing. The magnetic member surrounds the drive coil and comprises an opening. The yoke interacts with the magnetic member, generating a stable magnetic field. The magnetic member, yoke, and drive coil interact to generate a force parallel to the optical axis, moving the drive moving assembly parallel to the optical axis. The brake coil is disposed in the opening of the magnetic member and provides a central axis perpendicular to the optical axis. The brake coil opposes the drive coil. The braking resilient member is connected between the drive stator and the brake coil and disposed in the opening of the magnetic member. The brake coil interacts with the magnetic member, yoke, and braking resilient member and detachably abuts the drive moving assembly.

The optical device further comprises a guide bar disposed in the housing and parallel to the optical axis of the lens module. The lens module is movably fit on the guide bar.

The yoke comprises a main portion, a first extension portion, a second extension portion, and a third extension portion. The main portion is connected to the housing. The first and second extension portions are connected to the main portion. The second extension portion is separated from the first extension portion. The first extension portion surrounds the magnetic member. The drive coil and magnetic member are disposed between the first and second extension portions.

The third extension portion is connected to the first extension portion and disposed in the opening of the magnetic member.

The optical device further comprises a drive resilient member connected between the drive moving assembly and the drive stator. The drive moving assembly moves parallel to the optical axis by interaction of the drive coil, magnetic member, yoke, and drive resilient member.

The optical device further comprises a sliding member connected to the brake coil, restricting the brake coil to move perpendicular to the optical axis.

The optical device further comprises a friction member connected to the brake coil, abutting the drive moving assembly.

The optical device further comprises a friction member connected to the sliding member, abutting the drive moving assembly.

The friction member comprises frictional material.

The sliding member slides on the housing and comprises a guiding protrusion. The housing comprises a guiding groove in which the guiding protrusion slides.

The sliding member slides on the housing and comprises a guiding groove. The housing comprises a guiding protrusion sliding in the guiding groove.

The optical device further comprises a sliding member sliding on the third extension portion and connecting the brake coil, restricting the brake coil to move perpendicular to the optical axis.

The sliding member comprises a bearing. The third extension portion comprises a shaft on which the bearing slides.

The sliding member comprises a shaft. The third extension portion comprises a bearing in which the shaft slides.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best contemplated mode of carrying out the invention. This description is made for the purpose of illustrating the general principles of the invention and should not be taken in a limiting sense. The scope of the invention is best determined by reference to the appended claims.

First Embodiment

Figure 1:
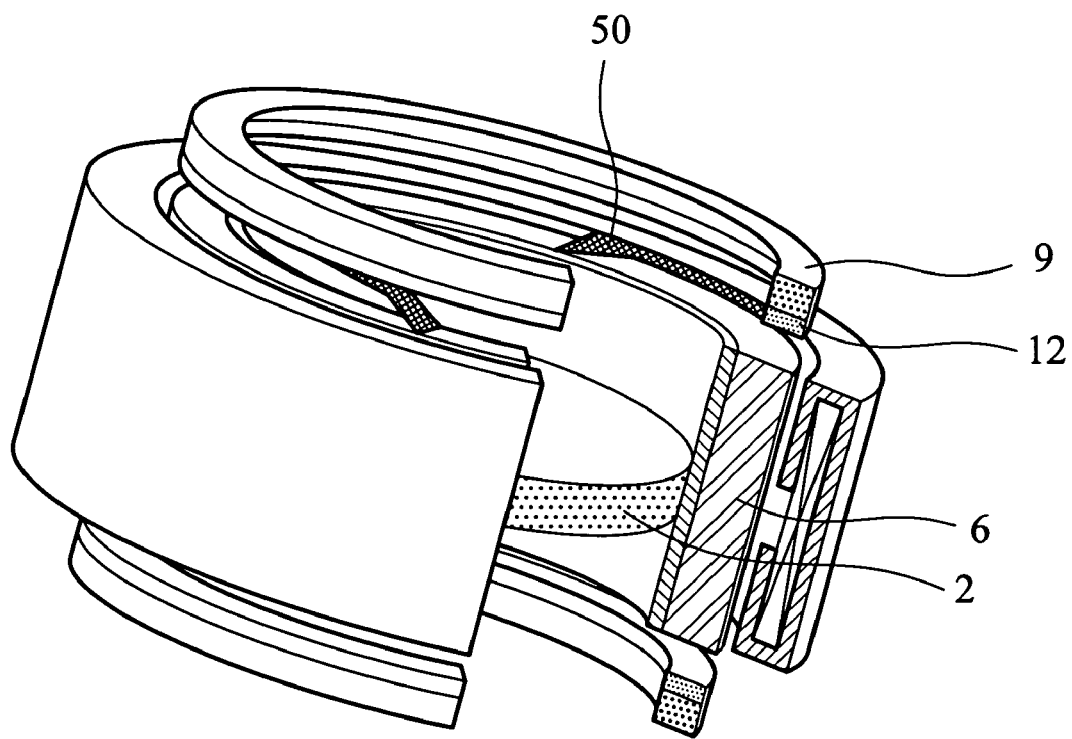
FIG. 1 is a partial perspective view of a conventional lens driving device.
Figure 2A:
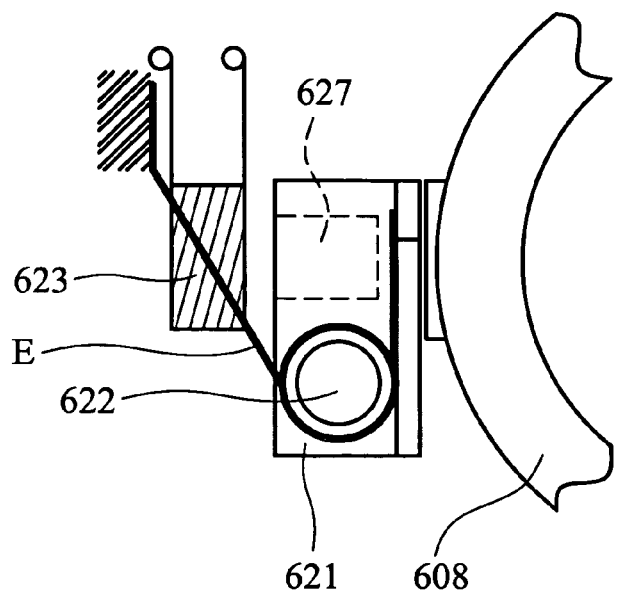
FIG. 2A is a schematic top view of a conventional brake device.
Figure 2B:
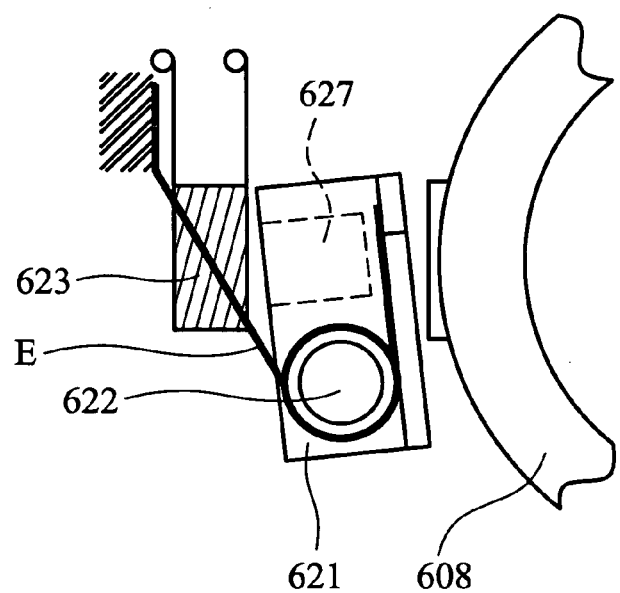
FIG. 2B is another schematic top view of the conventional brake device.
Figure 3A:
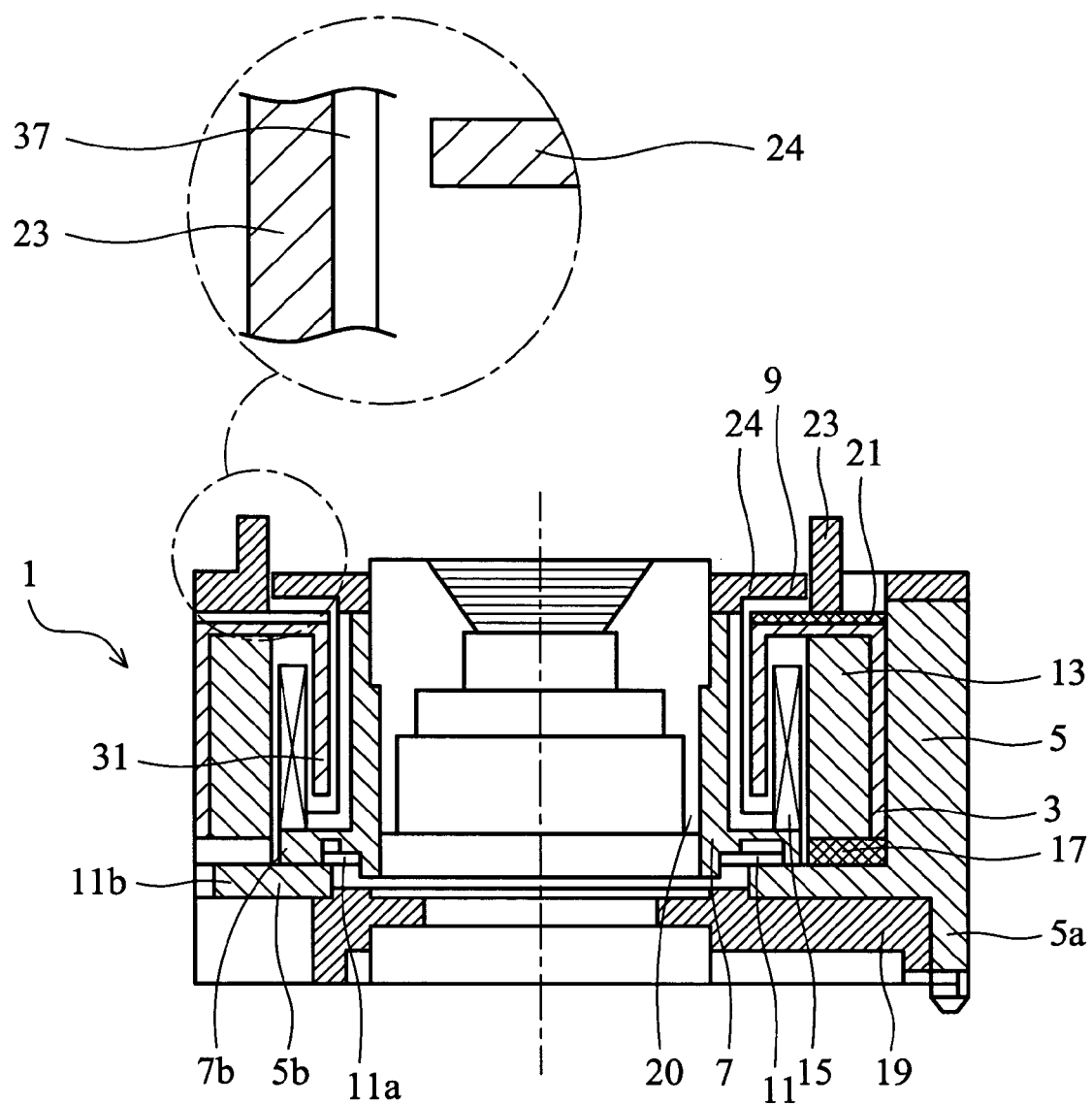
FIG. 3A is a schematic cross section of another conventional lens driving device.
Figure 3B:
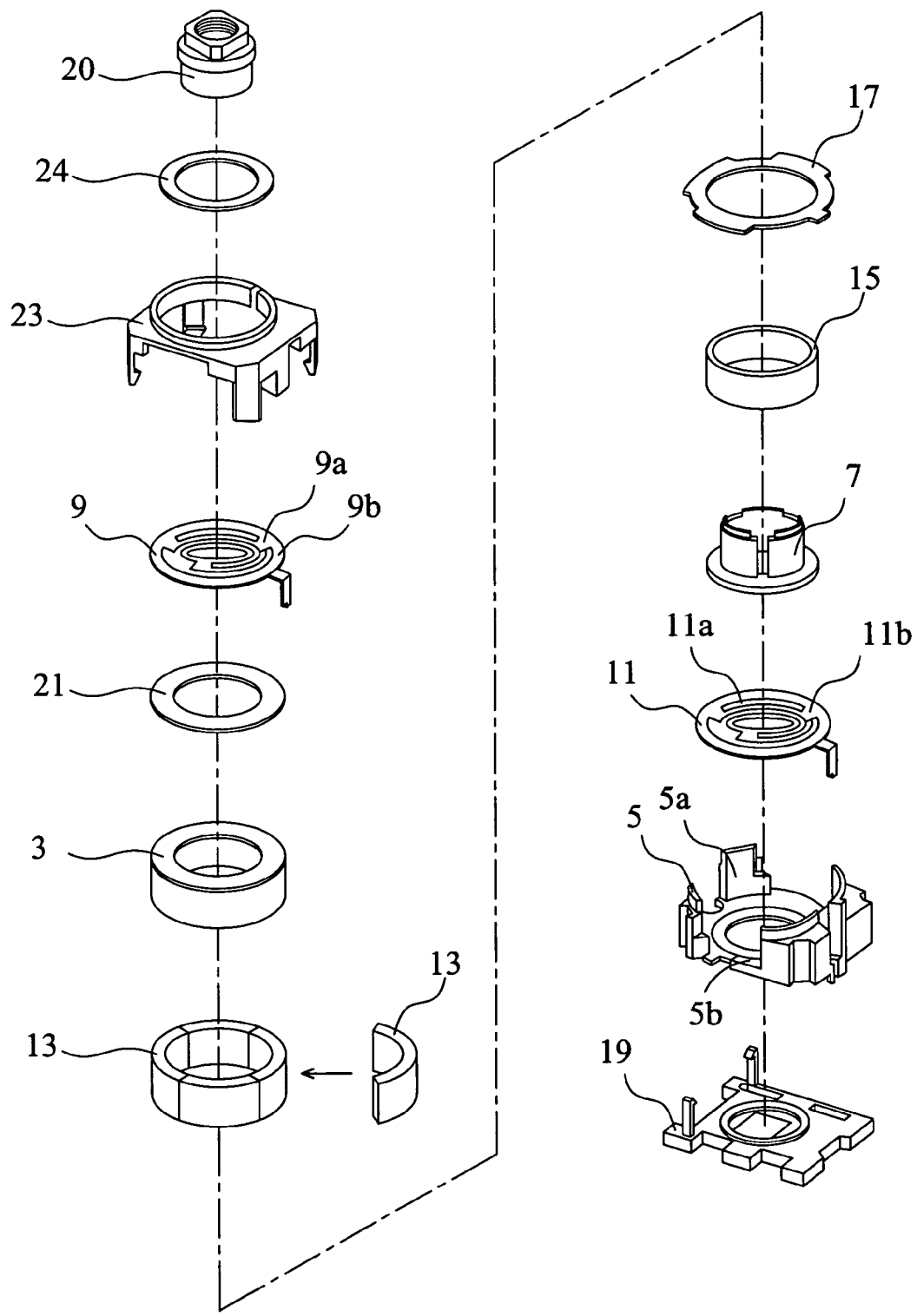
FIG. 3B is an exploded perspective view of the conventional lens driving device of FIG. 3A.
Figure 4A:
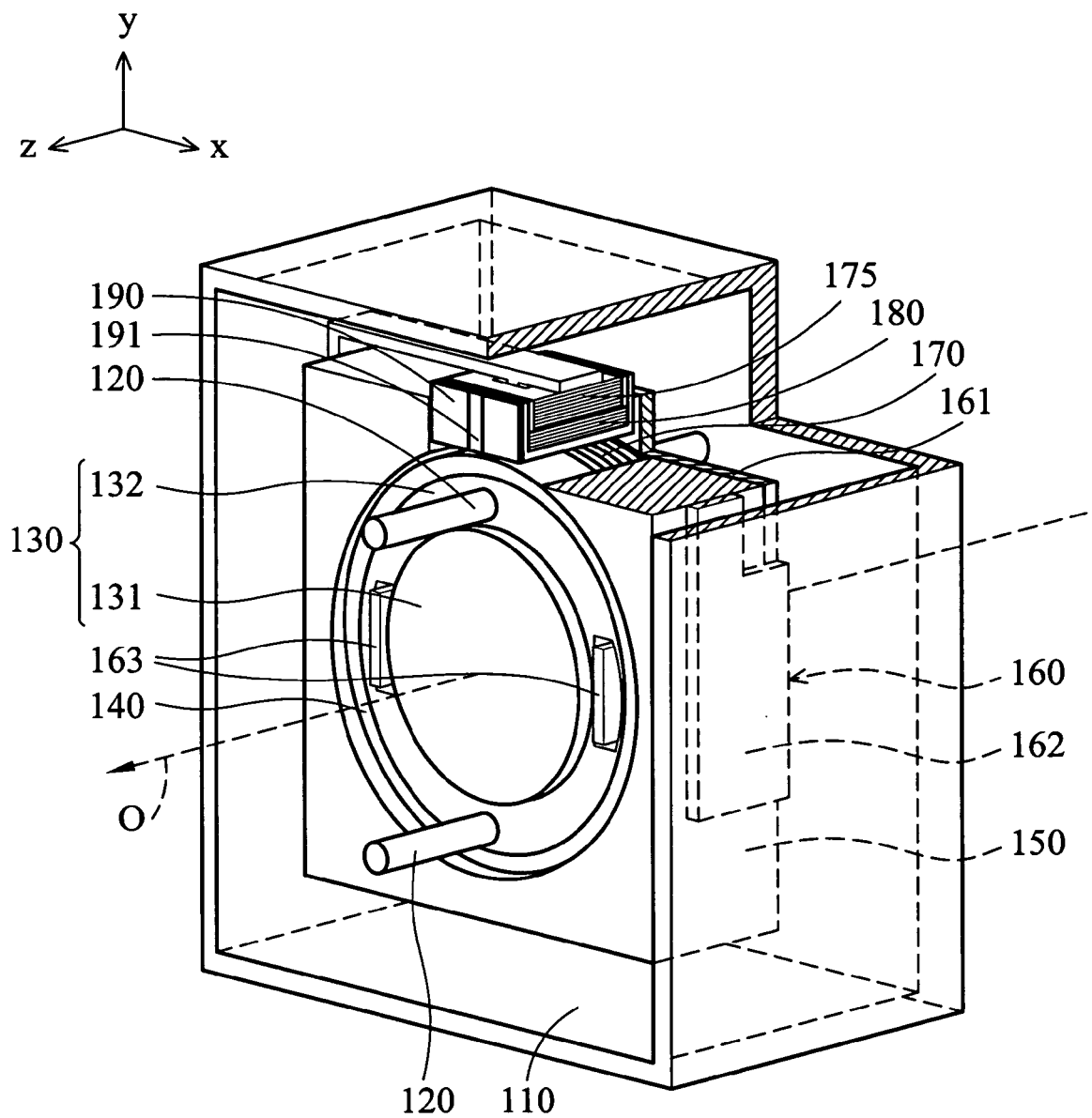
FIG. 4A is a schematic perspective view and partial cross section of an optical device of a first embodiment of the invention.
Figure 4B:
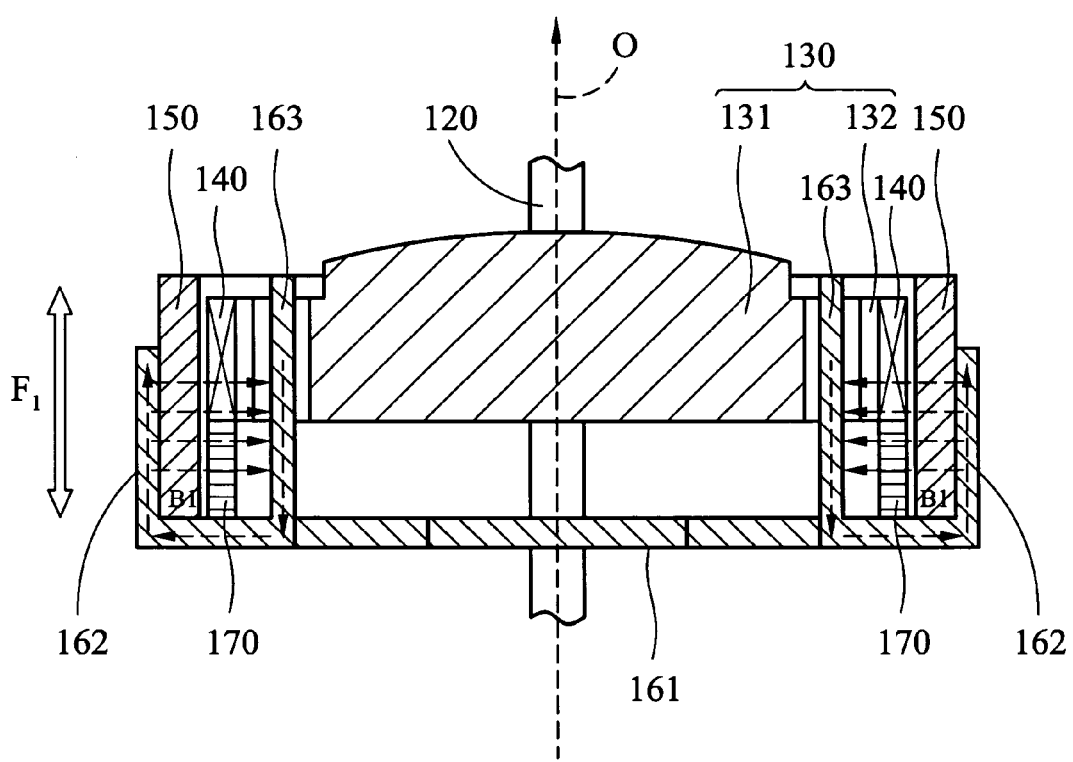
FIG. 4B is a partial cross section of FIG. 4A.
Figure 4C:
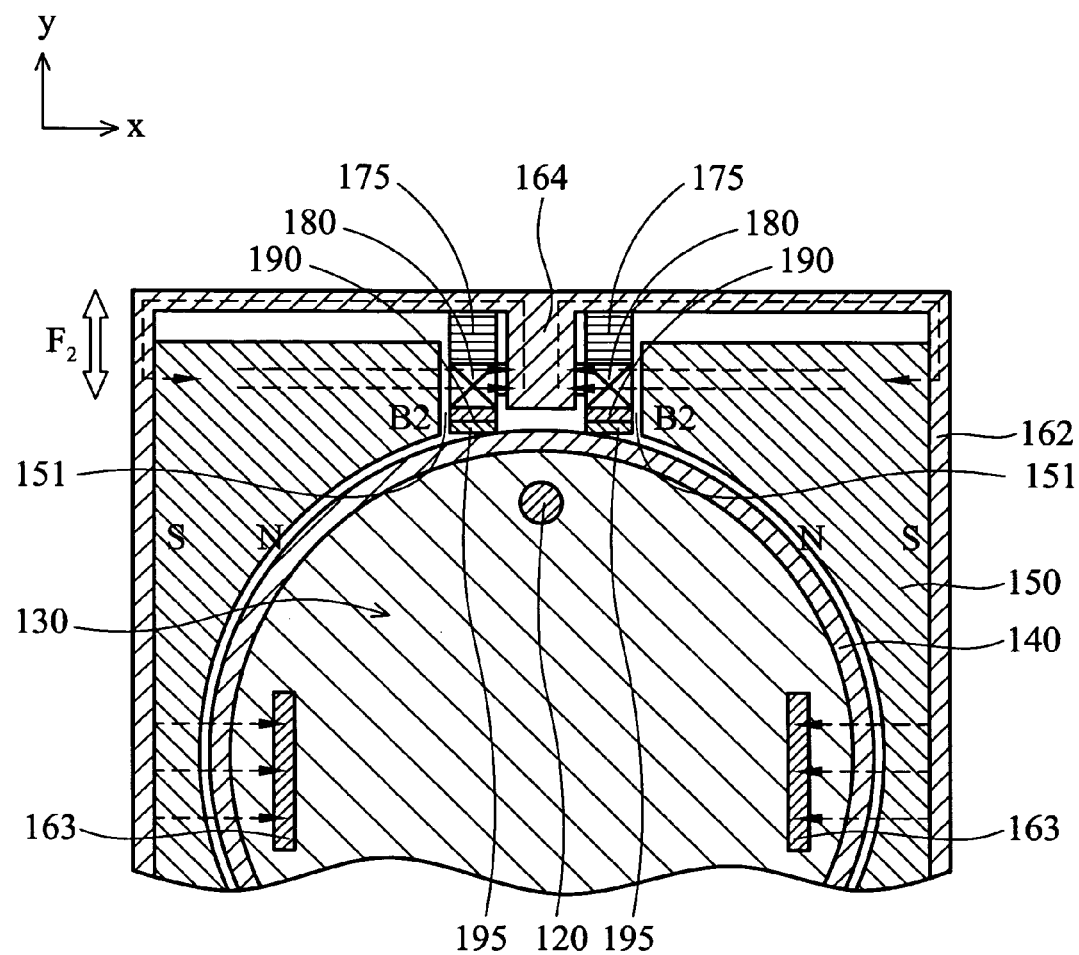
FIG. 4C is another partial cross section of FIG. 4A.

Referring to FIGS. 4A, 4B, and 4C, an optical device 100 comprises a housing 110, two guide bars 120, a lens module 130, a drive coil 140, a magnetic member 150, a yoke 160, a drive resilient member 170, a braking resilient member 175, a brake coil 180, a sliding member 190, and a friction member 195.

The optical device 100 can be divided substantially into a drive mechanism and a brake mechanism. The drive mechanism includes a drive moving assembly (including the lens module 130 and drive coil 140) and a drive stator (including the housing 110, guide bars 120, magnetic member 150, and yoke 160). The brake mechanism includes the braking resilient member 175, brake coil 180, sliding member 190, and friction member 195. The drive mechanism moves the lens module 130 parallel to an optical axis. The brake mechanism positions or fixes the lens module 130 when focus adjustment of the optical device 100 (or drive mechanism) is complete or stopped.

As shown in FIG. 4A and FIG. 4B, the guide bars 120 are disposed in the housing 110. The lens module 130 is disposed in the housing 110 and movably fit on the guide bars 120. Specifically, the lens module 130 comprises a lens 131 and a lens holder 132 and provides an optical axis O to which the guide bars 120 are respectively parallel.

As shown in FIGS. 4A, 4B, and 4C, the drive coil 140 surrounds the lens module 130 and provides a central axis aligned with the optical axis O of the lens module 130.

The magnetic member 150 surrounds the drive coil 140 and comprises an opening 151 (as shown in FIG. 4C). Specifically, two opposing magnetic poles are formed in the opening 151. Additionally, the magnetic member 150 may comprise a magnet.

As shown in FIGS. 4A, 4B, and 4C, the yoke 160 comprises a main portion 161, a first extension portion 162, a second extension portion 163, and a third extension portion 164. The main portion 161 is connected to the housing 110. The first extension portion 162 and second extension portion 163 are connected to the main portion 161. The second extension portion 163 is separated from the first extension portion 162. The first extension portion 162 surrounds the magnetic member 150. Specifically, the drive coil 140 and magnetic member 150 are disposed between the first extension portion 162 and the second extension portion 163. As shown in FIG. 4C, the third extension portion 164 is connected to the first extension portion 162 and disposed in the opening 151 of the magnetic member 150.

As shown in FIG. 4A and FIG. 4B, the drive resilient member 170 is connected between the drive moving assembly and the drive stator of the drive mechanism.

As shown in FIG. 4C, the braking resilient member 175 is connected to the first extension portion 162 and disposed in the opening 151 of the magnetic member 150.

As shown in FIG. 4A and FIG. 4C, the brake coil 180 is connected to the braking resilient member 175 and surrounds the third extension portion 164. Specifically, the brake coil 180 provides a central axis perpendicular to the optical axis O of the lens module 130 and opposes the drive coil 140.

Figure 5A:
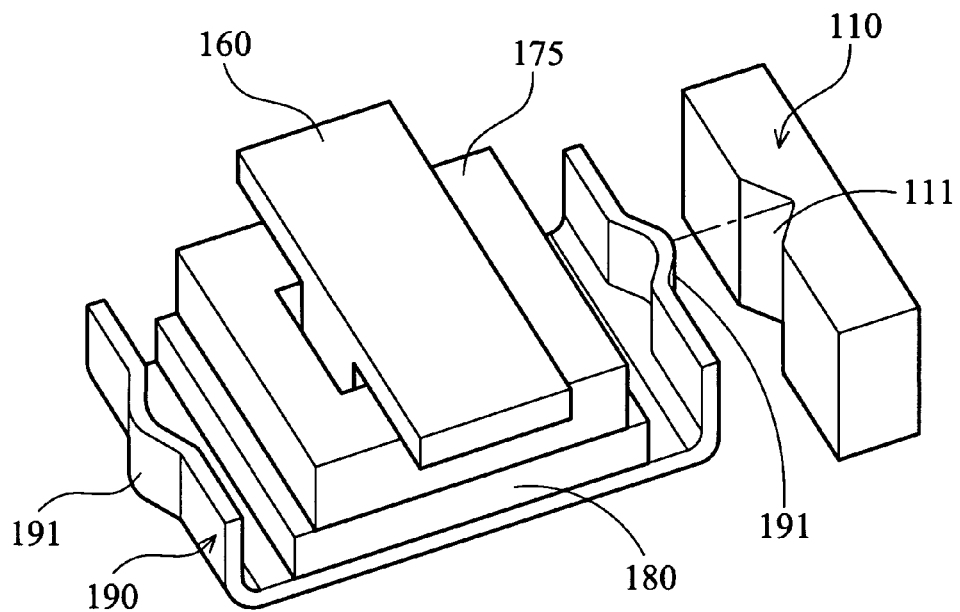
FIG. 5A is a partial perspective view of the optical device of the first embodiment of the invention.
Figure 5B:
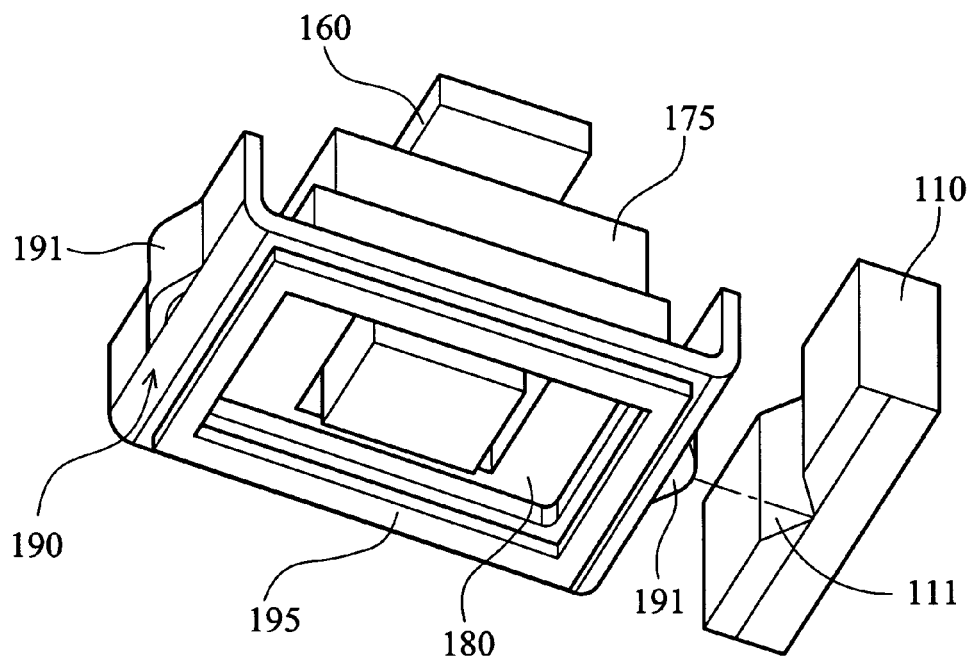
FIG. 5B is another partial perspective view of the optical device of the first embodiment of the invention.

As shown in FIGS. 4A, 4C, and 5B, the sliding member 190 is connected to the brake coil 180. The friction member 195 is connected to the sliding member 190, abutting the drive coil 140. Moreover, the friction member 195 may comprise frictional material with a high coefficient of friction, enhancing holding between the friction member 195 and the drive coil 140, further enhancing stability of the lens module 130 when positioned.

Moreover, the sliding member 190 can slide on the housing 110. As shown in FIG. 5A and FIG. 5B, the sliding member 190 comprises a guiding protrusion 191, and the housing 110 comprises a guiding groove 111 complementary to the guiding protrusion 191. Accordingly, when the sliding member 190 slides on the housing 110, the guiding protrusion 191 slides in the guiding groove 111.

The following description is directed to operation of the optical device 100.

As shown in FIG. 4B and FIG. 4C, the magnetic member 150 interacts with the yoke 160, generating magnetic lines (magnetic fields) B1 and B2 perpendicular to the optical axis O. Specifically, the magnetic member 150 interacts with the main portion 161, first extension portion 162, and second extension portion 163, generating the magnetic lines B1 (as shown in FIG. 4B) perpendicular to the optical axis O and passing through the drive coil 140. The magnetic member 150 interacts with the first extension portion 162 and third extension portion 164, generating the magnetic lines B2 (as shown in FIG. 4C) perpendicular to the optical axis O and passing through the brake coil 180.

To move the lens module 130, the brake coil 180 is energized by application of a current to interact with the magnetic lines B2, generating a force $F_2$ (as shown in FIG. 4C) perpendicular to the optical axis O according to the Lorentz law. The force $F_2$ moves the brake coil 180, sliding member 190, and friction member 195 perpendicular to the optical axis O, compressing the braking resilient member 175. At this point, the friction member 195 is separated from the lens module 130. Namely, the lens module 130 is released. In another aspect, the drive coil 140 is simultaneously energized by application of a current to interact with the magnetic lines B1, generating another force $F_1$ (as shown in FIG. 4B) parallel to the optical axis O according to the Lorentz law. The force $F_1$ moves the lens module 130 and drive coil 140 on the guide bars 120 along the optical axis O, compressing or elongating the drive resilient member 170. Accordingly, focus movement of the lens module 130 is achieved.

When the lens module 130 reaches a target focus position, application of the current to the brake coil 180 and drive coil 140 is stopped. At this point, the lens module 130 and drive coil 140 cannot move along the optical axis O in the absence of the force $F_1$, and the brake coil 180, sliding member 190, and friction member 195 immediately move toward the optical axis O of the lens module 130 in the absence of the force $F_2$ and by resilience provided by the braking resilient member 175. The friction member 195 again abuts the lens module 130, fixing the lens module 130 in the target focus position.

Accordingly, as the brake coil 180, sliding member 190, and friction member 195 can rapidly release and fix the lens module 130 and drive coil 140, no power is required to maintain the lens module 130 and drive coil 140 in the target focus position. Power consumption of the optical device 100 is thus reduced. Moreover, as the guiding protrusion 191 of the sliding member 190 slides in the guiding groove 111 of the housing 110, deviation, deflection or focus error, from external vibration or impact, of the lens module 130 is prevented.

Specifically, when operation of the optical device 100 is complete, the lens module 130 and drive coil 140 return to their initial positions along the optical axis O by resilience provided by the drive resilient member 170.

Moreover, the sliding member 190 is not limited to having a guiding protrusion 191 and the housing 110 is not limited to having a guiding groove 111. Namely, the sliding member 190 may comprise a guiding groove while the housing 110 may comprise a guiding protrusion, providing the optical device I 00 with the same shockproof capability.

Additionally, the braking resilient member of this embodiment is not limited to connection between the first extension portion 162 and the brake coil 180. The braking resilient member may be connected between the housing 110 and the brake coil 180, providing resilience to the brake mechanism.

Figure 5C:
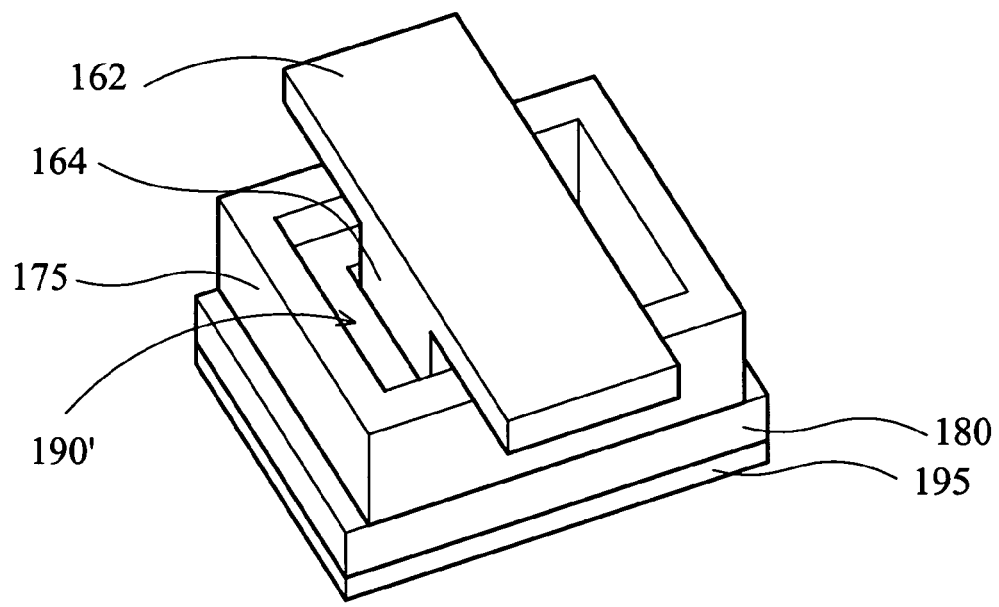
FIG. 5C is still another partial perspective view of the optical device of the first embodiment of the invention.
Figure 5D:
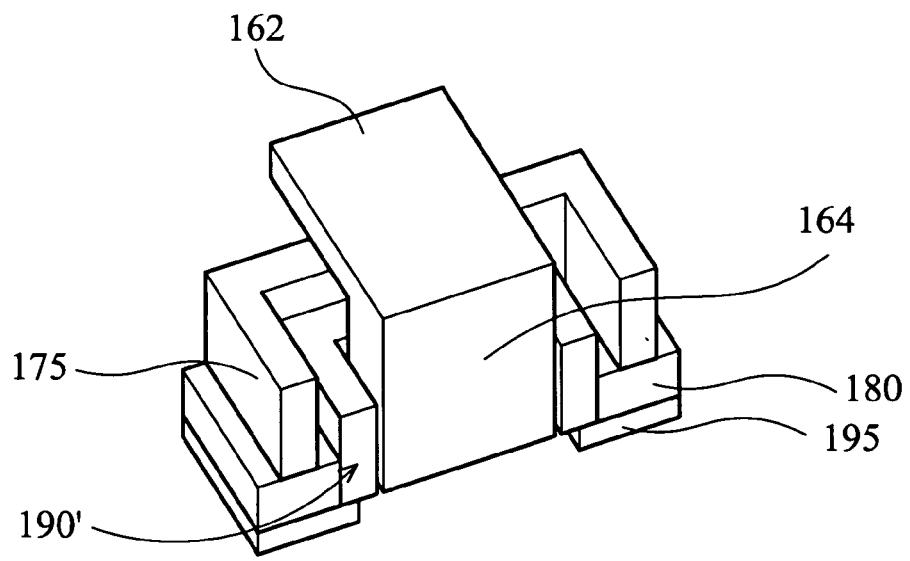
FIG. 5D is yet another partial perspective view of the optical device of the first embodiment of the invention.

Moreover, sliding between the sliding member 190 and the housing 110 may be achieved by a shaft and a bearing. As shown in FIG. 5C and FIG. 5D, the braking resilient member 175 is connected to the first extension portion 162 and disposed in the opening 151 of the magnetic member 150. A sliding member 190' surrounds the third extension portion 164 and is disposed in the opening 151 of the magnetic member 150. The brake coil 180 surrounds the sliding member 190' and provides a central axis perpendicular to the optical axis O of the lens module 130. The brake coil 180 opposes the drive coil 140. The friction member 195 is connected to the brake coil 180, abutting the drive coil 140. Moreover, the friction member 195 may comprise frictional material with a high coefficient of friction, enhancing holding between the friction member 195 and the drive coil 140, further enhancing stability of the lens module 130 when positioned.

Moreover, although a magnetic member 150 and yoke 160 are disclosed here, the optical device 100 may selectively employ more than two magnetic members and more than two yokes. Namely, the drive mechanism and brake mechanism of the optical device 100 may respectively employ independent magnetic members and yokes to achieve moving and positioning of the lens module 130.

Moreover, the optical device 100 of this embodiment is not limited to having only one brake mechanism. Namely, the optical device 100 may employ more than one brake mechanism to rapidly release and fix the lens module 130 as required.

Second Embodiment

Elements corresponding to those in the first embodiment share the same reference numerals.

Figure 6A:
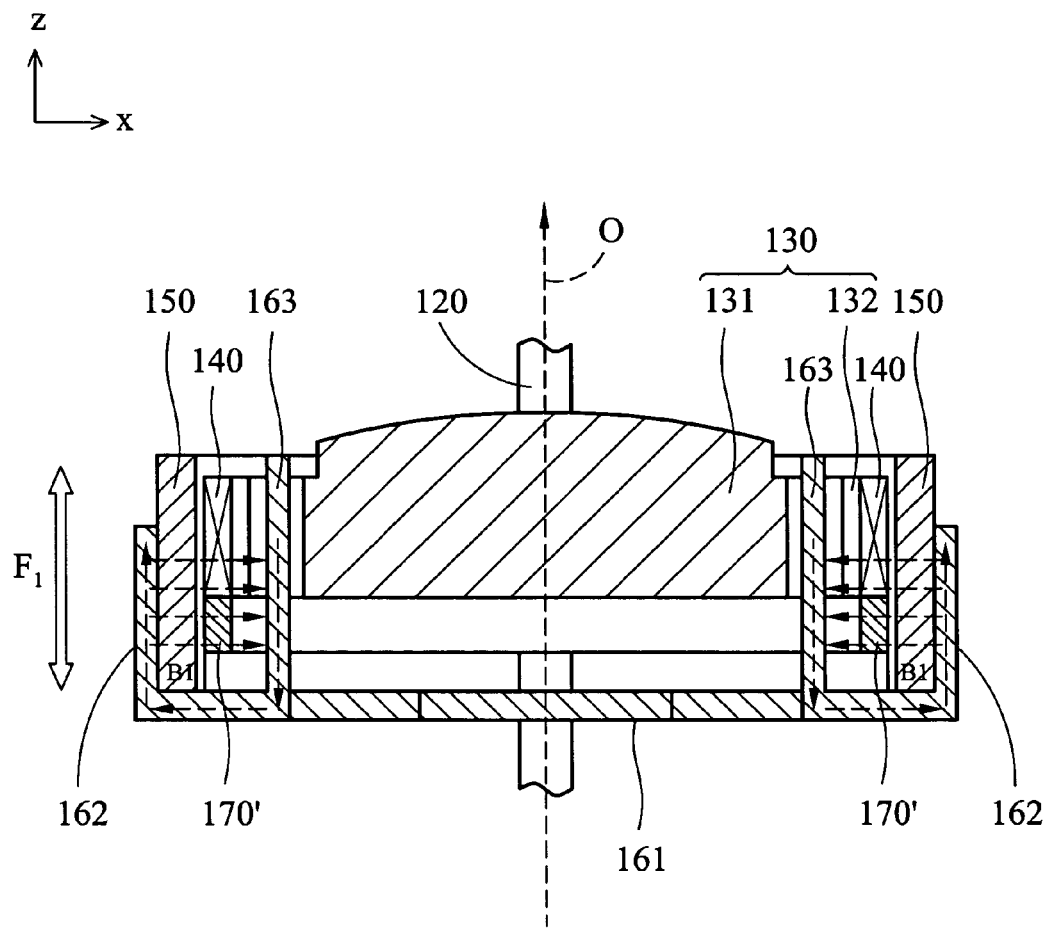
FIG. 6A is a partial cross section of an optical device of a second embodiment of the invention.
Figure 6B:
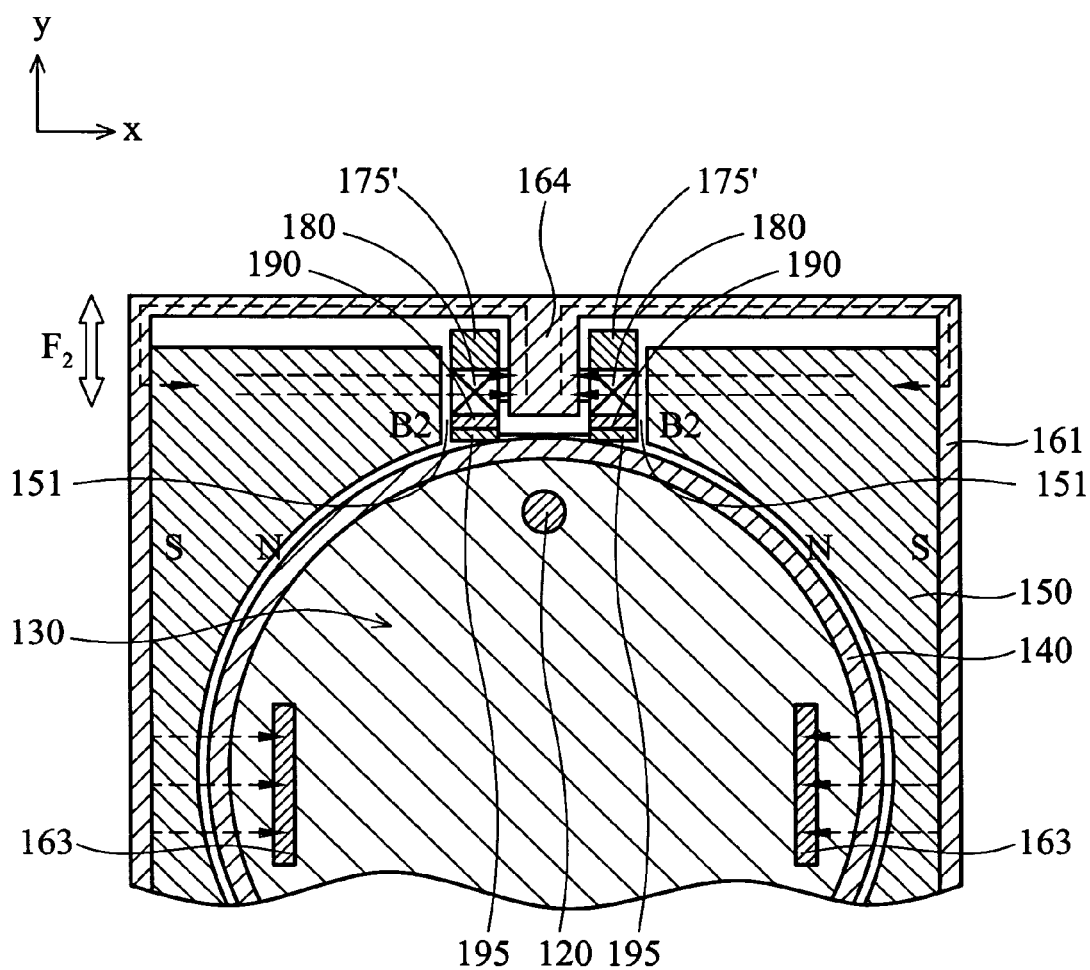
FIG. 6B is another partial cross section of the optical device of the second embodiment of the invention.

Referring to FIG. 6A and FIG. 6B, in this embodiment, the drive resilient member 170 and braking resilient member 175 of the first embodiment are respectively replaced by a drive magnetic-permeable member 470' and a brake magnetic-permeable member 175'.

As shown in FIG. 6A, the drive magnetic-permeable member 170' is connected to the drive moving assembly in the drive mechanism. Specifically, the drive magnetic-permeable member 170' is connected to the drive coil 140 and disposed among the first extension portion 162, second extension portion 163, and main portion 161.

As shown in FIG. 6B, the brake magnetic-permeable member 175' is disposed in the opening 151 of the magnetic member 150. The brake coil 180 is connected to the brake magnetic-permeable member 175' and surrounds the third extension portion 164.

The drive magnetic-permeable member 170' and brake magnetic-permeable member 175' may be composed of metal.

Specifically, the drive magnetic-permeable member 170' is attracted by the magnetic member 150, generating resultant magnetic forces parallel and perpendicular to the optical axis. When the drive magnetic-permeable member 170' is located in a specific position on the magnetic member 150, the resultant magnetic force between the drive magnetic-permeable member 170' and the magnetic member 150 and parallel to the optical axis reaches a level of static equilibrium. At this point, only the resultant magnetic force perpendicular to the optical axis exists between the drive magnetic-permeable member 170' and the magnetic member 150 and reaches equilibrium because the drive moving assembly in the drive mechanism is fit on the guide bars. Namely, the drive moving assembly and drive magnetic-permeable member 170' are stably stationary. In another aspect, the brake magnetic-permeable member 175' is attracted by the magnetic member 150, generating resultant magnetic forces parallel and perpendicular to the central axis of the brake coil 180. When the brake magnetic-permeable member 175' is in a specific position in the opening 151 of the magnetic member 150, the resultant magnetic force between the brake magnetic-permeable member 175' and the magnetic member 150 and parallel to central axis of the brake coil 180 reaches static equilibrium. At this point, only the resultant magnetic force perpendicular to the central axis of the brake coil 180 exists between the brake magnetic-permeable member 175' and the magnetic member 150 and reaches equilibrium because the brake coil 180 surrounds the third extension portion 164. Namely, the brake coil 180 and brake magnetic-permeable member 175' are stably stationary. In this embodiment, the drive magnetic-permeable member 170' is in the specific position on the magnetic member 150 when the drive coil 140 is not energized by application of a current. The resultant magnetic force between the drive magnetic-permeable member 170' and the magnetic member 150 and parallel to the optical axis reaches static equilibrium when the drive magnetic-permeable member 170' is in the specific position. The brake magnetic-permeable member 175' is in the specific position in the opening 151 of the magnetic member 150 when the brake coil 180 is not energized by application of a current. The resultant magnetic force between the brake magnetic-permeable member 175' and the magnetic member 150 and parallel to the central axis of the brake coil 180 reaches static equilibrium when the brake magnetic-permeable member 175' is in the specific position.

Structure, disposition, and function of other elements in this embodiment are the same as those in the first embodiment, and explanation thereof is omitted for simplicity.

Similarly, to move the lens module 130, the brake coil 180 is energized by application of a current to interact with the magnetic lines B2, generating a force $F_2$ (as shown in FIG. 6B) perpendicular to the optical axis O according to the Lorentz law. The force $F_2$ moves the brake coil 180, sliding member 190, friction member 195, and brake magnetic-permeable member 175' perpendicular to the optical axis O. At this point, the friction member 195 is separated from the lens module 130 and the brake magnetic-permeable member 175' deviates from the specific position in the opening 151 of the magnetic member 150. In another aspect the drive coil 140 is simultaneously energized by application of a current to interact with the magnetic lines B1, generating another force $F_1$ (as shown in FIG. 6A) parallel to the optical axis O according to the Lorentz law. The force $F_1$ moves the lens module 130, drive coil 140, and drive magnetic-permeable member 170' on the guide bars 120 along the optical axis O. Accordingly, focus movement of the lens module 130 is achieved. At this point, the drive magnetic-permeable member 170' diverges from the specific position on the magnetic member 150.

When the lens module 130 reaches a target focus position, application of the current to the brake coil 180 and drive coil 140 is stopped. At this point, the lens module 130 and drive coil 140 cannot move along the optical axis O in the absence of the force $F_1$, and the brake magnetic-permeable member 175' is attracted by the magnetic member 150 via the opening 151 and immediately moves toward a predetermined position, forcing the friction member 195 to again abut the lens module 130. The lens module 130 is thus fixed in the target focus position.

Similarly, as the brake coil 180, sliding member 190, and friction member 195 can rapidly release and fix the lens module 130 and drive coil 140, no power is required to maintain the lens module 130 and drive coil 140 at the target focus position. Power consumption of the optical device 100 is thus reduced. Moreover, as the guiding protrusion 191 of the sliding member 190 slides in the guiding groove 111 of the housing 110, deviation, deflection or focus error, caused by external vibration or impact, of the lens module 130 is prevented.

Specifically, when operation of the optical device 100 is complete or stopped, the drive magnetic-permeable member 170' immediately moves toward the predetermined position on the magnetic member. 150 by attraction of the magnetic member 150, returning the lens module 130 and drive coil 140 to their initial positions along the optical axis O.

Third Embodiment

Figure 7A:
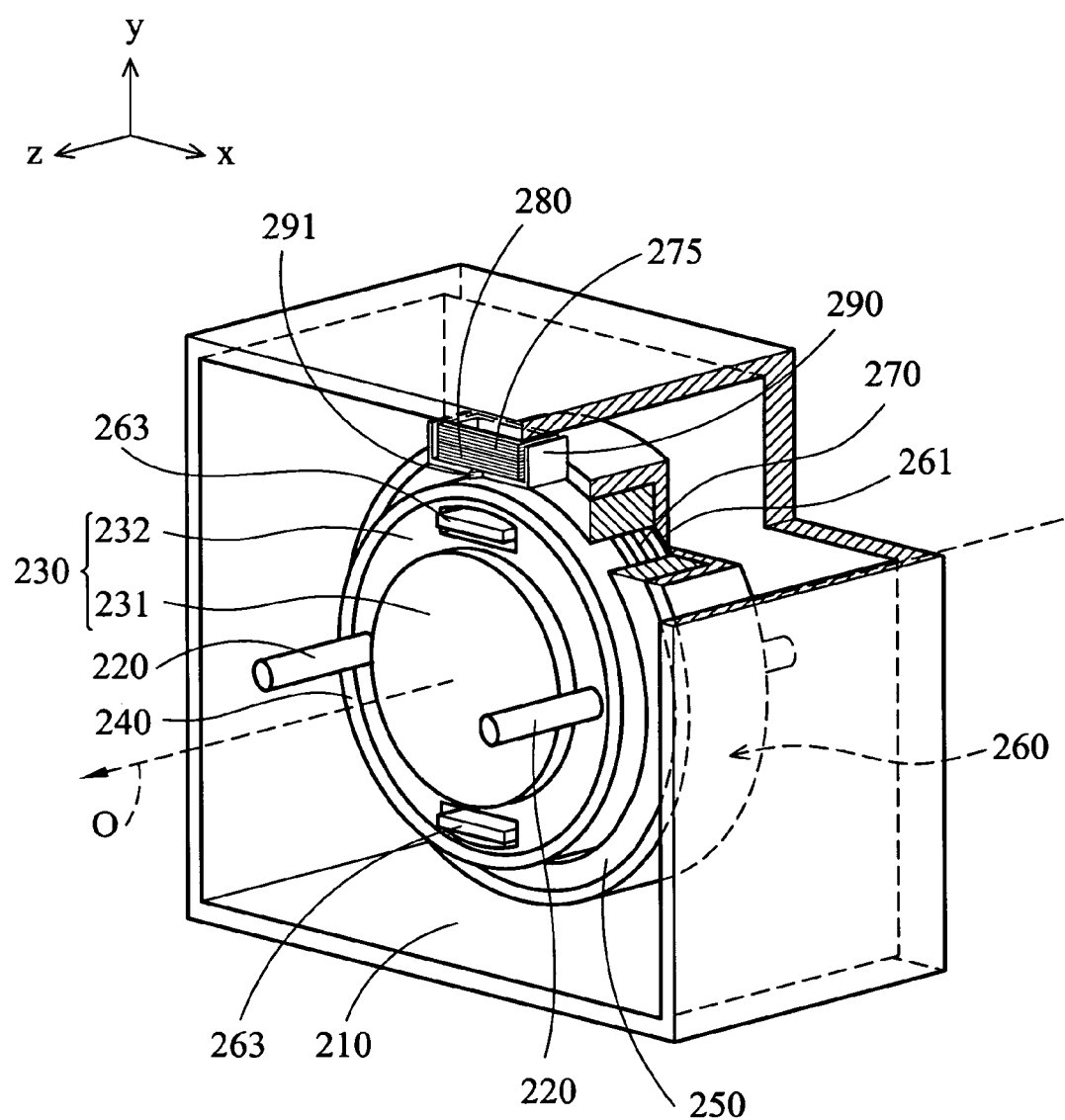
FIG. 7A is a schematic perspective view and partial cross section of an optical device of a third embodiment of the invention.
Figure 7B:
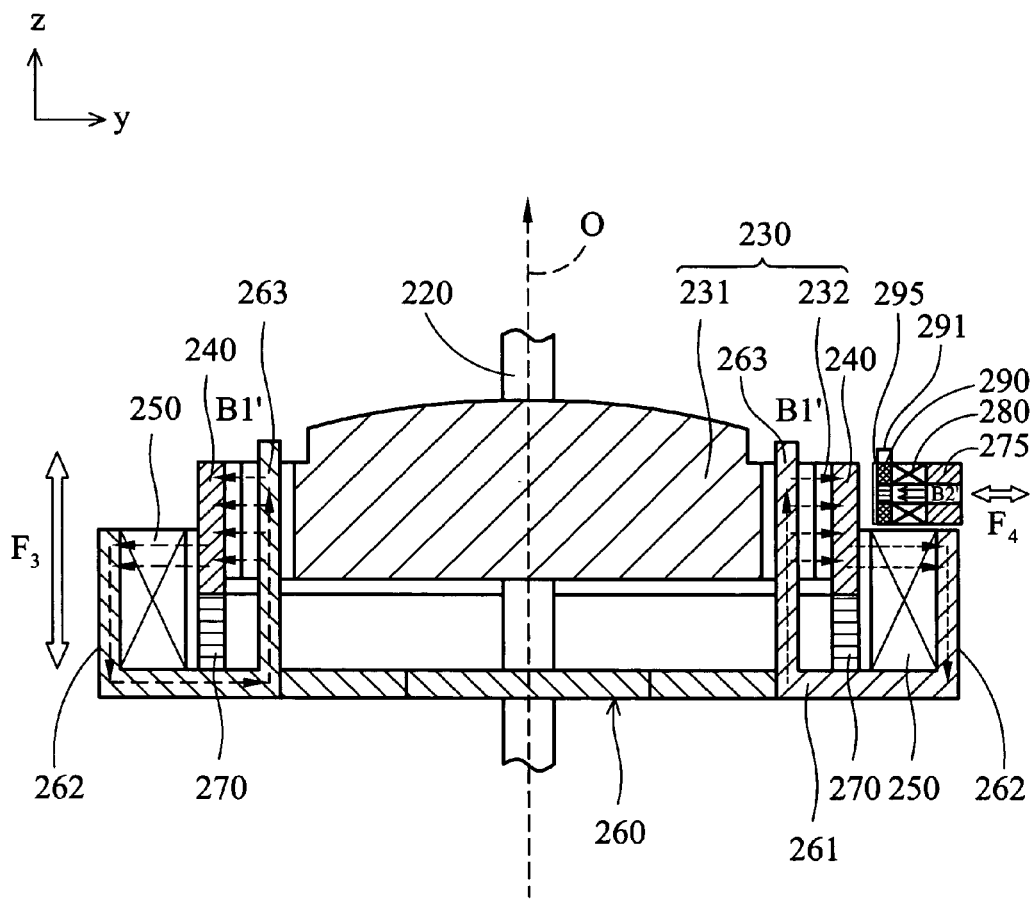
FIG. 7B is a partial cross section of FIG. 7A.

Referring to FIG. 7A and FIG. 7B, an optical device 200 comprises a housing 210, two guide bars 220, a lens module 230, a magnetic member 240, a drive coil 250, a yoke 260, a drive resilient member 270, a braking resilient member 275, a brake coil 280, a sliding member 290, and a friction member 295.

The optical device 200 can be divided substantially into a drive mechanism and a brake mechanism. The drive mechanism includes a drive moving assembly (including the lens module 230 and magnetic member 240) and a drive stator (including the housing 210, guide bars 220, drive coil 250, and yoke 260). The brake mechanism includes the braking resilient member 275, brake coil 280, sliding member 290, and friction member 295. The drive mechanism moves the lens module 230 parallel to an optical axis. The brake mechanism positions or fixes the lens module 230 when focus adjustment of the optical device 200 (or drive mechanism) is complete or stopped.

As shown in FIG. 7A and FIG. 7B, the guide bars 220 are disposed in the housing 210. The lens module 230 is disposed in the housing 210 and movably fit on the guide bars 220. Specifically, the lens module 230 comprises a lens 231 and a lens holder 232 and provides an optical axis O to which the guide bars 220 are respectively parallel.

The magnetic member 240 surrounds the lens module 230. The drive coil 250 surrounds the magnetic member 240 and provides a central axis aligned with the optical axis O of the lens module 230. Additionally, the magnetic member 240 may be a magnet.

The yoke 260 comprises a main portion 261, a first extension portion 262, and a second extension portion 263. The main portion 261 is connected to the housing 210. The first extension portion 262 and second extension portion 263 are connected to the main portion 261. The second extension portion 263 is separated from the first extension portion 262. The first extension portion 262 surrounds the drive coil 250. Specifically, the drive coil 250 and magnetic member 240 are disposed between the first extension portion 262 and the second extension portion 263.

The drive resilient member 270 is connected between the drive moving assembly and the drive stator of the drive mechanism. The braking resilient member 275 is connected to the housing 210. Specifically, the drive resilient member 270 is connected between the magnetic member 240 and the main portion 261 of the yoke 260.

The brake coil 280 is connected to the braking resilient member 275 and opposes the magnetic member 240. The brake coil 280 provides a central axis perpendicular to the optical axis O of the lens module 230. Additionally, the brake coil 280 opposes the second extension portion 263.

The sliding member 290 is connected to the brake coil 280. The friction member 295 is connected to the sliding member 290, abutting the magnetic member 240. Moreover, the friction member 295 may comprise frictional material with a high coefficient of friction, enhancing holding between the friction member 195 and the magnetic member 240, and further enhancing stability of the lens module 230 when positioned.

Moreover, the sliding member 290 can slide on the housing 210. As shown in FIG. 7A and FIG. 7B, the sliding member 290 comprises a guiding protrusion 291, and the housing 210 comprises a guiding groove (not shown) complementary thereto. Accordingly, when the sliding member 290 slides on the housing 210, the guiding protrusion 291 slides in the guiding groove.

The following description is directed to operation of the optical device 200.

As shown in FIG. 7B, the magnetic member 240 interacts with the yoke 260, generating magnetic lines (magnetic field) B1' perpendicular to the optical axis O. Specifically, the magnetic member 240 interacts with the main portion 261, first extension portion 262, and second extension portion 263, generating the magnetic lines B1' (as shown in FIG. 7B) perpendicular to the optical axis O and passing through the drive coil 250.

When the lens module 230 performs focus movement, the brake coil 280 is energized by application of a current, generating magnetic lines (magnetic field) B2' therein. At this point, as shown in FIG. 7B, as the brake coil 280 opposes the magnetic member 240, the direction of the magnetic lines B2' is opposite that of the magnetic lines B1', thus generating a magnetic repulsion force $F_4$ perpendicular to the optical axis O. The repulsion force $F_4$ moves the brake coil 280, sliding member 290, and friction member 295 perpendicular to the optical axis O, compressing the braking resilient member 275. At this point, the friction member 295 is separated from the lens module 230. Namely, the lens module 230 is released. In another aspect, the drive coil 250 is simultaneously energized by application of a current to interact with the magnetic lines B1', generating a force $F_3$ (as shown in FIG. 7B) parallel to the optical axis O according to the Lorentz law. The force $F_3$ moves the magnetic member 240 and lens module 230 on the guide bars 220 along the optical axis O, compressing or elongating the drive resilient member 270. Accordingly, focus movement of the lens module 230 is achieved.

When the lens module 230 reaches a target focus position, application of the current to the brake coil 280 and drive coil 250 is stopped. At this point, the lens module 230 and magnetic member 240 cannot move along the optical axis O in the absence of the force $F_3$, and the brake coil 280, sliding member 290, and friction member 295 immediately move toward the magnetic member 240 in the absence of the magnetic repulsion force $F_4$ and by resilience provided by the braking resilient member 275. The friction member 295 again abuts the magnetic member 240, fixing the lens module 230 in the target focus position.

Accordingly, as the brake coil 280, sliding member 290, and friction member 295 can rapidly release and fix the magnetic member 240 and lens module 230, no power is required to maintain the lens module 230 in the target focus position. Power consumption of the optical device 200 is thus reduced. Moreover, as the guiding protrusion 291 of the sliding member 290 slides in the guiding groove of the housing 210, deviation, deflection or focus error from external vibration or impact, of the lens module 230 is prevented.

Moreover, the sliding member 290 is not limited to having a guiding protrusion 291 and the housing 210 is not limited to having a guiding groove. Namely, the sliding member 290 may comprise a guiding groove while the housing 210 may comprise a guiding protrusion, providing the optical device 200 with the same shockproof capability.

Moreover, although a magnetic member 240 is disclosed here, the optical device 200 may selectively employ more than two magnetic members. Namely, the drive mechanism and brake mechanism of the optical device 200 may respectively employ independent magnetic members to achieve moving and positioning of the lens module 230.

Moreover, the optical device 200 of this embodiment is not limited to only one brake mechanism. Namely, the optical device 200 may employ more than one brake mechanism to rapidly release and fix the lens module 230 as required.

Fourth Embodiment

Elements corresponding to those in the third embodiment share the same reference numerals.

Figure 8:
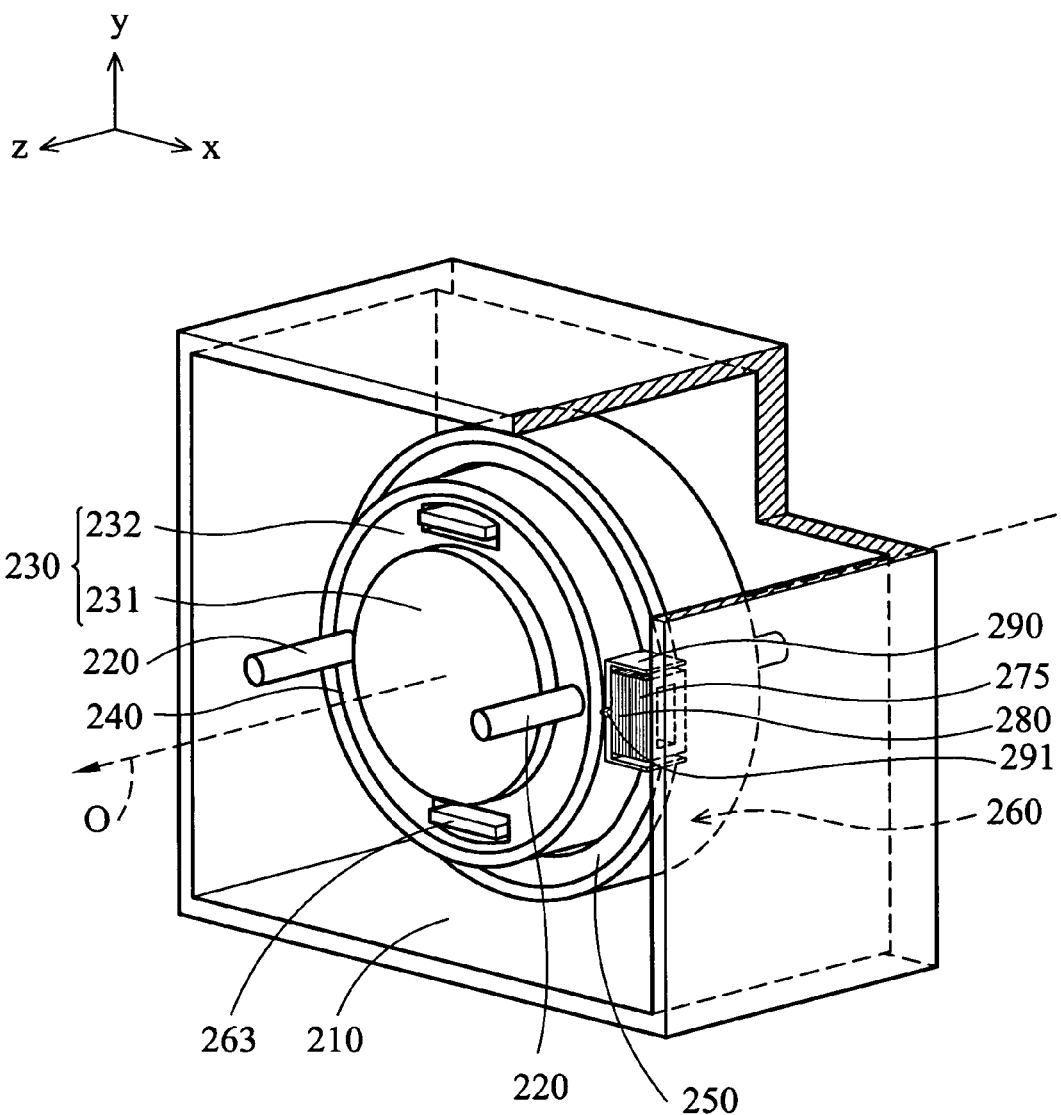
FIG. 8 is a schematic perspective view of an optical device of a fourth embodiment of the invention.

Referring to FIG. 8, the major difference between this and the third embodiment is the position of the brake mechanism. Specifically, in the optical device 200' of this embodiment, the brake coil 280 provides a central axis perpendicular to the optical axis O of the lens module 230. The brake coil 280, however, does not oppose the second extension portion 263. Also, the brake coil 280, sliding member 290, and friction member 295 can rapidly release and fix the magnetic member 240 and lens module 230.

Structure, disposition, and function of other elements in this embodiment are the same as those in the third embodiment, and explanation thereof is omitted for simplicity.

In conclusion, in the disclosed optical devices, lens modules can be miniaturized and power required to position the lens modules conserved. Shockproof capability and stability of the lens modules are enhanced.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical device, comprising:
   a drive moving assembly comprising a lens module and a drive coil, wherein the lens module provides an optical axis, and the drive coil surrounds the lens module and provides a central axis parallel to the optical axis;

a drive stator, comprising:

a housing, the lens module of the drive moving assembly being movably disposed in the housing;

a magnetic member surrounding the drive coil of the drive moving assembly, comprising an opening; and a yoke interacting with the magnetic member to generate a magnetic field, comprising a main portion connected to the housing, a first extension portion connected to the main portion, a second extension portion connected to the main portion and separated from the first extension portion, and a third extension portion connected to the first extension portion, wherein the first extension portion surrounds the magnetic member, the drive coil of the drive moving assembly and the magnetic member are disposed between the first and second extension portions, the third extension portion is disposed in the opening of the magnetic member, and the magnetic member, the yoke, and the drive coil interact to generate a force parallel to the optical axis of the lens module of the drive moving assembly, moving the drive moving assembly parallel to the optical axis of the lens module of the drive moving assembly;

a brake coil disposed in the opening of the magnetic member of the drive stator and providing a central axis perpendicular to the optical axis of the lens module of the drive moving assembly, wherein the brake coil opposes the drive coil of the drive moving assembly; and a braking resilient member connected between the drive stator and the brake coil and disposed in the opening of the magnetic member of the drive stator, wherein the brake coil interacts with the magnetic member and the yoke of the drive stator, and the braking resilient member and detachably abuts the drive moving assembly.

2. The optical device as claimed in claim 1, further comprising a guide bar disposed in the housing of the drive stator and parallel to the optical axis of the lens module of the drive moving assembly, wherein the lens module of the drive moving assembly is movably fit on the guide bar.

3. The optical device as claimed in claim 1, further comprising a drive resilient member connected between the drive moving assembly and the drive stator, wherein the drive moving assembly moves parallel to the optical axis of the lens module of the drive moving assembly by interaction of the drive coil of the drive moving assembly, the magnetic member and the yoke of the drive stator, and the drive resilient member.

4. The optical device as claimed in claim 1, further comprising a sliding member connected to the brake coil, restricting the brake coil to move perpendicular to the optical axis of the lens module of the drive moving assembly.

5. The optical device as claimed in claim 1, further comprising a friction member connected to the brake coil, abutting the drive moving assembly.

6. The optical device as claimed in claim 4, further comprising a friction member connected to the sliding member, abutting the drive moving assembly.

7. The optical device as claimed in claim 5, wherein the friction member comprises frictional material.

8. The optical device as claimed in claim 6, wherein the friction member comprises frictional material.

9. The optical device as claimed in claim 4, wherein the sliding member slides on the housing of the drive stator and comprises a guiding protrusion, and the housing of the drive stator comprises a guiding groove in which the guiding protrusion slides.

10. The optical device as claimed in claim 4, wherein the sliding member slides on the housing of the drive stator and comprises a guiding groove, and the housing of the drive stator comprises a guiding protrusion sliding in the guiding groove.

11. The optical device as claimed in claim 1, further comprising a sliding member sliding on the third extension portion and connecting the brake coil, restricting the brake coil to move perpendicular to the optical axis of the lens module of the drive moving assembly.

12. The optical device as claimed in claim 11, wherein the sliding member comprises a bearing, and the third extension portion comprises a shaft on which the bearing slides.

13. The optical device as claimed in claim 11, wherein the sliding member comprises a shaft, and the third extension portion comprises a bearing in which the shaft slides.

* * * * *

UNITED STATES PATENT AND TRADEMARK OFFICE
CERTIFICATE OF CORRECTION

PATENT NO.       : 7,652,835 B2                                    Page 1 of 1
APPLICATION NO.  : 11/542844
DATED            : January 26, 2010
INVENTOR(S)      : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 568 days.

Signed and Sealed this

Twenty-third Day of November, 2010

David J. Kappos
*Director of the United States Patent and Trademark Office*